United States Patent [19]

Anderson

[11] 4,164,143
[45] Aug. 14, 1979

[54] ULTRASONIC AMPLIFIER DETECTOR

[75] Inventor: Ralph A. Anderson, Chino, Calif.

[73] Assignee: Bourns, Inc., Riverside, Calif.

[21] Appl. No.: 921,935

[22] Filed: Jul. 3, 1978

[51] Int. Cl.² .............................................. G01F 1/32
[52] U.S. Cl. ............................................... 73/194 VS
[58] Field of Search .................. 73/194 VS; 329/168, 329/169; 330/135, 282

[56] References Cited

U.S. PATENT DOCUMENTS

| | | | |
|---|---|---|---|
| 3,098,199 | 7/1963 | Carney et al. | 330/282 |
| 3,432,763 | 3/1969 | Ingman | 330/135 |
| 3,680,375 | 8/1972 | Joy et al. | 73/194 |
| 3,948,098 | 4/1976 | Richardson et al. | 73/194 |

*Primary Examiner*—Herbert Goldstein
*Attorney, Agent, or Firm*—Paul H. Ware; William G. Becker

[57] ABSTRACT

Method and apparatus for amplification of amplitude-modulated, ultrasonic frequency, electronic signals providing superior loss-of-carrier signal detection. Low noise integrated circuits are employed to provide high amplification of low level input signals without adding appreciable electrical noise during the amplification process. An automatic gain control (AGC) circuit ensures a nearly constant level of ultrasonic signal amplitudes from the amplifier without excessive amplification of electrical noise under conditions of low applied input signals. The electrical noise, inherent in the system, has only minimal effect on the loss-of-carrier detector.

8 Claims, 4 Drawing Figures

ULTRASONIC AMPLIFIER DETECTOR

BACKGROUND OF THE INVENTION

1. Field of the Invention

This invention relates generally to fluid flow measuring devices and more particularly to ultrasonic devices in which a Karman vortex street is induced in a flowing fluid by placing a vortex-generating obstruction in the flowing fluid and processing the resulting vortices so as to amplitude-modulate an electrical carrier signal.

2. Description of the Prior Art

Flow meters are known in which vortices are induced in a fluid and then counted by some means to provide an indication of the velocity of fluid flow. In some representative types, incorporated signal amplifiers are operated in a saturated mode and switched from positive to negative saturation to generate rectangular waves at the vortex occurring frequency. Aside from the harmonic noise generated by such a device, switching has been found to be erratic as a result of low input signal amplitudes and to exhibit a dead-band between positive and negative going input signals that contributes to further erratic behavior of such a system. In many instances, a flow rate of from zero to some upper limit would be characterized by an output signal over a range of currents different from zero to some upper limit. For example, in one such system, a range of output currents of from 4 ma to 20 ma corresponding to a flow rate range of from zero to about 20 feet/second is reported with no mention of the linearity of the system. Such an offset of output signal from input phenomenon can cause calibration difficulties along with the readout problems associated with a non-linear system.

Many different circuits and configurations of elements have been employed in the prior art in attempts to solve the problems presented. Most have either presented new problems or only partially solved those existing problems, or both.

Among circuit designs in use, one applies fixed amplification to the received ultrasonic carrier signal, while another applies automatic gain control to the amplification of the received ultrasonic carrier signal in an effort to stabilize the signal amplitude at the amplifier output. In the former system, when carrier signal amplitude is low, the modulating signal is also low in amplitude resulting in improper functioning under most required operating conditions. In the latter system, poor operation results from the presence of inherently high internally generated noise in most high gain integrated circuit amplifiers under conditions that the automatic gain control is not activated by a relatively high carrier signal amplitude. Thus, as carrier strength decreases, the gain of the amplifier increases and amplifies its own inherent, internally generated noise until at some gain level the amplitude of the thus-amplified noise signals is as high as the normal minimum modulating signal amplitude and the noise is thus detected as flow data. Many of these devices have thus met special needs as presented by specific problems and have therefore served narrow purposes. These prior art devices, among other disadvantages, have been unreliable and unpredictable in operation under continued use and have been expensive and complicated to manufacture. Some of these prior art devices have been described in the following listed patents which were brought to the attention of the applicant through a novelty search conducted in the United States Patent and Trademark Office:

1. U.S. Pat. No. 3,413,564—Seifried
   Issued: Nov. 26, 1968
   "Combined A.G.C. and Signal Indicator" Shows a combined A.G.C. and failure indicator circuit.
2. U.S. Pat. No. 3,948,098—Richardson et al
   Issued: Apr. 6, 1976
   "Vortex Flow Meter Transmitter Including Piezo-Electric Sensor" Shows a fluid flow instrument using vortices generated by a piezo-electric crystal to measure fluid flow by rate of pulses generated by the crystal.
3. U.S. Pat. No. 3,854,334—Herzl
   Issued: Dec. 17, 1974
   "Signal Recovery System for Vortex Type Flow Meter"
   Shows a fluid flow meter of the vortex type using a sensor (disclosed as such only generally) and which includes an "Electronic Flywheel" in measuring the pulsation rate signal output of the sensor.

It would thus be a great advantage to the art to provide a superior method of amplification of amplitude-modulated, ultrasonic frequency electronic signals such as are employed in fluid flow measuring devices.

It would be a further great advantage to the art to provide superior demodulation capabilities to perform signal detection in fluid flow measurement systems.

It would also be of advantage to the art to provide a detectable signal indicating a fault in the event that the acoustic path is broken during operation of the flow measuring device.

An additional important advantage would be the provision of the above listed advantages in a manner such that existing systems might be modified so as to obtain the advantages sought by the present invention.

SUMMARY OF THE INVENTION

It is an object of the present invention to provide superior amplification of amplitude-modulated, ultrasonic frequency signals such as are employed in fluid flow measuring devices.

A further object of the invention is to provide superior demodulation of amplitude-modulated signals so as to perform signal detection in fluid flow measurement systems.

Another object of this invention is to provide a detectable signal to indicate a fault in the event that the acoustic path is disrupted during operation of a fluid flow measuring device of the type contemplated by the invention.

A still further object of the present invention is to fulfill the above described objects in a manner such that existing systems may be modified so as to obtain the advantages set forth.

In the accomplishment of these and other objects, an electronic circuit is provided in which a waveform, modulated by modulating properties of induced vortices, is processed to provide a measure of fluid flow parameters and also to provide a disconnect signal in the event the acoustic path in the fluid becomes disrupted for any reason.

It is well-known that under certain conditions, vortices are shed at regular intervals, alternately, from the edges of an obstruction placed in a stream of fluid normal to the direction of flow. A steady state formation called a Karman vortex street is formed by these alternately occurring vortices. This formation comprises two approximately parallel rows of evenly spaced vortices, displaced from each other in a dimension perpendicular to the direction of fluid flow, depending, among other things, upon the shape and size of the obstruction. The spacing between the vortices in each row in a dimension along the direction of fluid flow exhibits a near constancy for a given range of flow rates, thus fluid velocity is a function of vortex formation for this range. The problem of determining fluid flow rate may then have as a solution the determination of vortex shedding frequency in the fluid.

In the presently described device, the fluid to be measured is passed through a tube which contains a vortex generating strut of triangular cross section. As has been seen, a Karman vortex street is formed, comprising vortices that are formed at a rate directly proportional to volume of fluid flow. An ultrasonic acoustic carrier wave, formed by a piezoelectric crystal in a conventional manner as is well-known in the art, is propagated in the fluid stream in a direction normal to the direction of fluid flow and downstream of the vortex formations therein. The induced vortices disturb, and thus amplitude-modulate, this acoustic carrier wave. The resultant composite acoustic signal is received by a piezoelectric crystal and converted to a composite electrical signal as will be shown in greater detail. This composite electrical signal is amplified and the modulating waveform recovered using conventional amplitude modulation radio audio detection techniques. The important fact to note is that the number of repetition cycles of the modulating waveform occurring during any time period is directly proportional to the volume of gas flow during that time period. The amplitude of the recovered modulating signal, representing the number of repetition cycles of the modulating waveform, is dependent on the degree of modulation of the carrier signal and may range from 1% to nearly 100% as a function of flow rate and other factors. A major factor in the degree of modulation of the carrier signal is the strength of the carrier signal itself which in turn depends, among other factors, on composition of the fluid under measurement, distance between transmitting and receiving piezoelectric crystals, reflections of the acoustic wave from crystal surfaces and other surfaces in the assembly, resonant frequency match between transmitting and receiving crystals, oscillation frequency of the carrier signal, and capacitive coupling, to name but a few.

It is also desirable in many applications contemplated by the invention to produce a detectable signal indicating a fault under conditions that the ultrasonic acoustic path becomes disrupted by some means such as opening of the flow tube holder, etc. Such a signal shall be referred to in what follows as a "disconnect" signal. The circuit of the prior art employing fixed gain fails, with some combinations of electronic components and flow sensor assemblies, to reliably detect this kind of disconnect because the fixed gain is generally set high enough to allow detection of flow under all so-called normal operating conditions and, as such, this circuit amplifies noise and ultrasonic signals coupled from the transmitter drive circuitry through stray capacitances, to an amplitude approaching that of the normal carrier. The problem is exacerbated in the automatic gain control system of the prior art particularly because of its very high gain. Thus when disconnect occurs, the output noise becomes high enough in amplitude to be indistinquishable from flow data signals.

In the circuits of the invention, negative feedback is employed to ensure that the amplification factor, under conditions of no automatic gain control, is accurately defined and stable over the operational life of the system. Noise voltages at the output of the circuit of the invention under conditions of no automatic gain control and very low or no carrier input and gain set at maximum, are much lower than the minimum expected modulating signal amplitudes, thus not having the problem of confusing flow data with output noise. The integrated circuit amplifiers chosen for this application are operational amplifiers that were designed primarily for use in hi-fidelity sound systems that exhibit very low noise generating characteristics. The voltage gain of the circuit of the invention is automatically controlled by the amplitude of the input carrier signal just as occurs in conventional automatic gain control circuits, however, the range of the gain control has been adjusted for this application and is relatively small but well defined. Large d.c. voltage changes, derived from small carrier amplitude changes, are used both to control the amplifier gain and as an indication of carrier amplitude in the disconnect circuit. When disconnect occurs, thus dropping the carrier signal to near zero, the large d.c. voltage change which is generated thereby causes the amplifier gain to go to maximum immediately. This change in d.c. voltage, known as the disconnect signal whenever it exceeds a preset level, is used as an indication that disconnect has occurred. It is a further feature of the circuit of the invention that the automatic gain control maintains a relatively constant carrier signal amplitude to the demodulator. Thus the amplitude of the demodulated flow data signal is stabilized.

BRIEF DESCRIPTION OF THE DRAWINGS

Further advantages and features of the present invention will be more fully apparent to those skilled in the art to which the invention pertains from the ensuing detailed description thereof, regarded in conjunction with the accompanying drawings wherein like reference characters refer to like parts throughout and in which.

DETAILED DESCRIPTION

Although specific embodiment of the invention will now be described with reference to the drawings, it should be understood that such embodiments are by way of example only and merely illustrative of but a small number of the many possible specific embodiments which can represent applications of the principles of the invention. Various changes and modifications obvious to one skilled in the art to which the invention pertains are deemed to be within the spirit, scope and contemplation of the invention as further defined in the appended claims.

Figure 1:
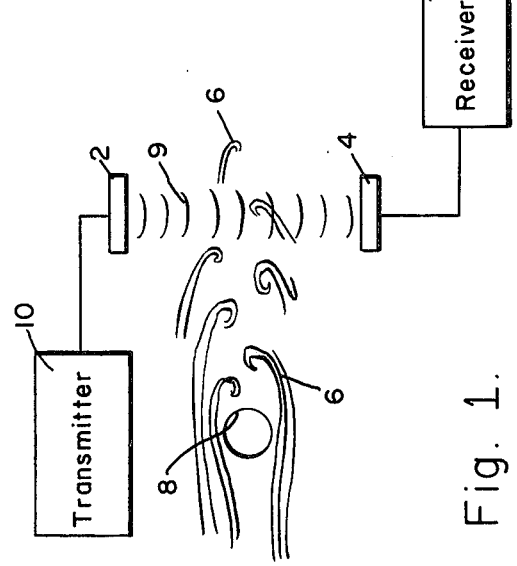
FIG. 1 is a conceptual schematic diagram showing formation of vortices so as to form a Karman vortex street in a moving fluid and their incidence into an acoustic signal energy path.

Referring to FIG. 1 with greater particularity, a transmitter 10 develops an acoustic carrier wave by means of transmitter transducer 2. This acoustic carrier wave signal energy path is denoted by the numeral 9. A fluid is assumed to be flowing from the left toward the right and the vortex strut 8 is shown as interposed in the path of that fluid so as to induce the vortices 6. These vortices are alternately formed on opposite sides of the vortex strut so as to define between them a Karman vortex street in the direction of fluid flow. These vortices disturb and thus modulate the acoustic carrier wave signal forming a composite acoustic signal that impinges upon receiver transdcer 4. This composite signal is processed in receiver 20 to derive a signal that is a function of the fluid flow rate. Another signal that may be developed in receiver 20 is the disconnect signal that would signify the disruption of the acoustic carrier wave signal energy path 9.

Figure 2:
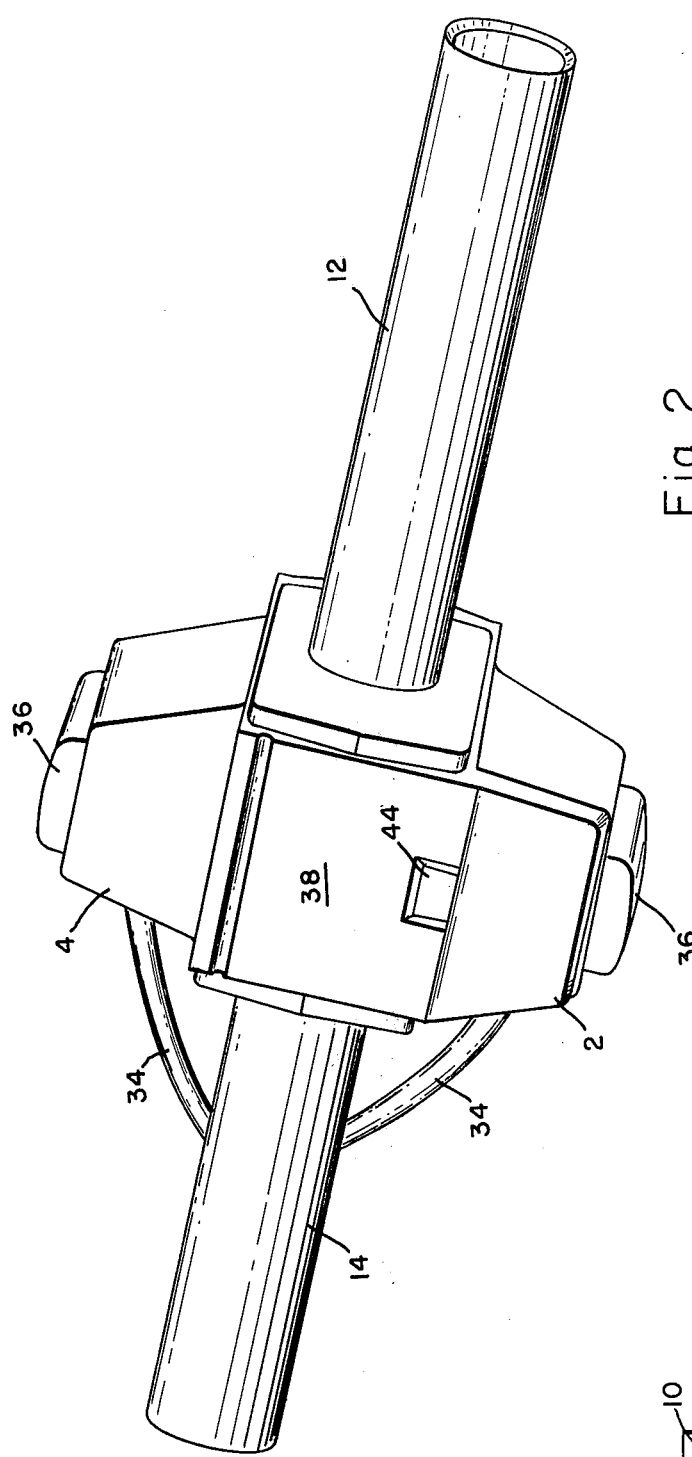
FIG. 2 is a perspective pictorial drawing of an assembled flow tube.

FIG. 2 is a pictorial drawing that illustrates a physical configuration of a flow measuring device as contemplated by the invention. An entry tube 12 accepts the flowing fluid and conducts it through the sensing space defined by keeper 38 which includes transmitter and receiver housings 2 and 4 respectively which also contain the piezoelectric transducers necessary to the operation of the device. The keeper 38 is retained in its position about the sensing space of the flow tube by latch 44. Cables 34 attach to transmitter and receiver housings by means of cable strain reliefs 36. Egress of the fluid is accomplished by means of exit tube 14.

Figure 3:
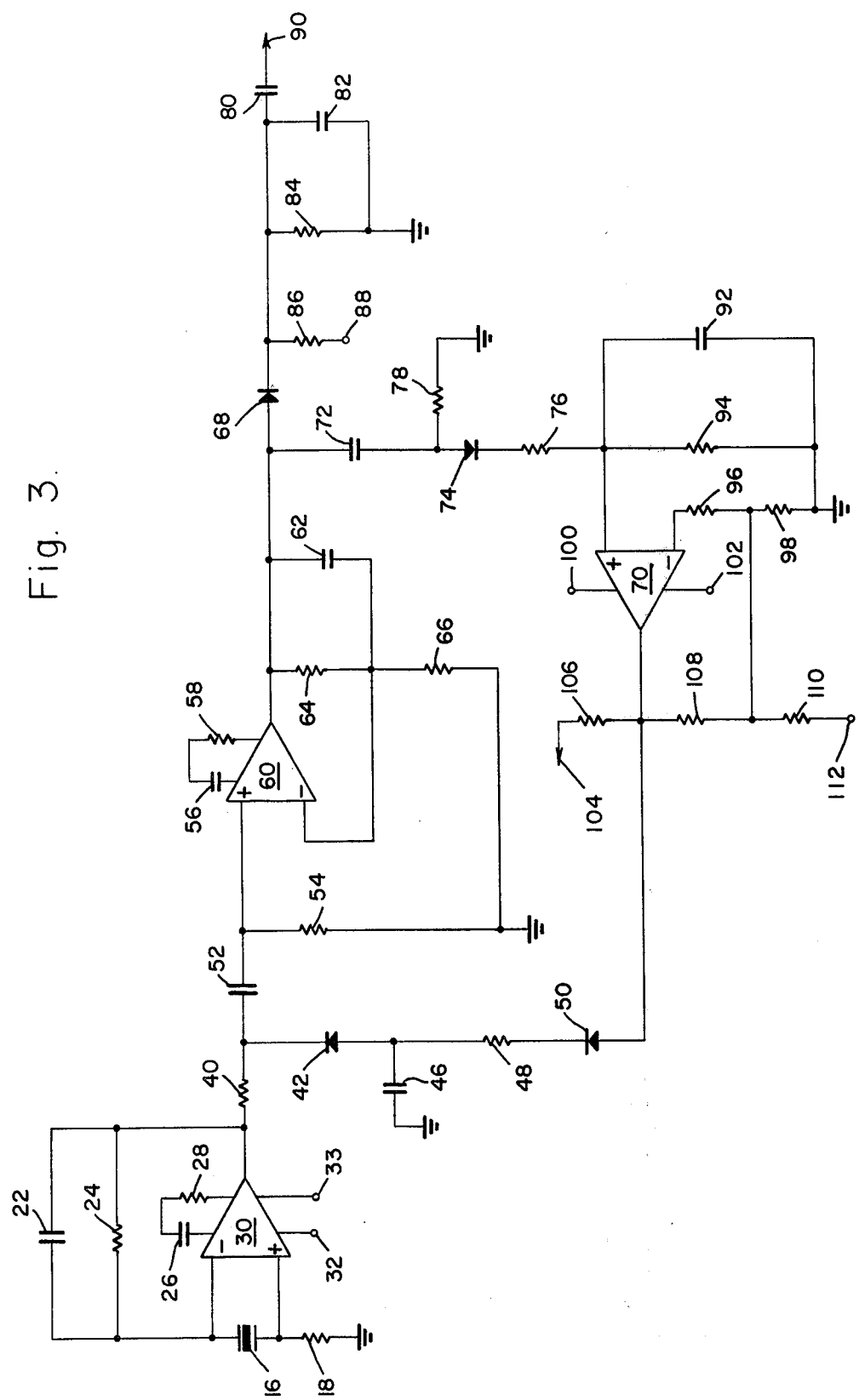
FIG. 3 is a schematic diagram of a circuit as used to accomplish the objects as contemplated by the invention.

Directing attention now to FIG. 3, the operation of the circuit of the invention may be described. The amplitude-modulated, ultrasonic frequency acoustic wave generated in the signal energy path 9 (FIG. 1), impinges on the receiver crystal 16. Receiver crystal 16 is connected to the input terminals of first carrier amplifier 30 and to an external feedback network thereabout comprising resistor 24 and capacitor 22. Resistor 18 provides a d.c. path to ground. Receiver crystal 16, responsive to the amplitude-modulated, ultrasonic acoustic wave, generates a low-level alternating voltage at the ultrasonic frequency which is proportional in magnitude to the strength of the ultrasonic acoustic wave. This voltage is applied to first carrier amplifier 30 which has positive and negative voltage terminals 32 and 33 respectively and an internal feedback network comprising resistor 28 and capacitor 26. The amplified output signal from first carrier amplifier 30 is divided by the resistive voltage divider formed by resistor 40 and diode 42 provided diode 42 is in the forward conducting state. Capacitor 46 provides a low impedance path to ground for alternating currents through diode 42. This amplified alternating signal output from first carrier amplifier 30 is applied by way of coupling capacitor 52 to second carrier amplifier 60 which has a feedback network comprising resistor 58 and capacitor 56. Signal output from second carrier amplifier 60 is developed at resistor 64 and capacitor 62 and applied to diode 68 and also to diode 74 by means of coupling capacitor 72. Resistor 54 provides a conventional d.c. path to ground. Resistors 64 and 66 determine the closed loop gain of the second carrier amplifier 60 in a conventional manner for non-inverting amplifier configurations. A carrier frequency filter formed by resistors 84 and 86 and capacitor 82 filters the signal so as to preserve only the modulating frequency components of the signal, which components appear at flow data output 90 by means of coupling capacitor 80.

Output signal from second carrier amplifier 60, coupled to diode 74 by coupling capacitor 72, is rectified thereby to provide a d.c. voltage across capacitor 92 proportional to the average amplitude of the carrier signal. Resistor 78 provides a d.c. path to ground. Resistor 76 along with resistor 94 and capacitor 92 act as a resistor-capacitor filter which removes the carrier and modulating frequency components from the d.c. voltage on capacitor 92. This d.c. voltage is applied to the non-inverting input of operational amplifier 70. A d.c. offset voltage is applied to the inverting input of operational amplifier 70 by means of a positive voltage applied at positive voltage terminal 112, through resistors 110 and 96.

If the carrier-derived voltage applied at the non-inverting input to operational amplifier 70 is larger than the d.c. offset voltage applied at the inverting input, then the output voltage signal from operational amplifier 70 becomes positive. This positive output voltage is effective to drive current through diode 50, resistor 48, diode 42, and resistor 40. The d.c. current level through diode 42 establishes the impedance level of that diode to the carrier signal current through resistor 40. As we have seen, diode 42 and resistor 40 form an a.c. voltage divider wherein diode 42 acts as a variable impedance device.

The impedance of diode 42 is automatically adjusted by the d.c. current through it to maintain a constant carrier signal amplitude at the input to second carrier amplifier 60. With a constant input signal amplitude and fixed gain, second carrier amplifier 60 supplies a constant amplitude a.c. voltage to the amplitude modulation demodulator formed by diode 68, resistors 84 and 86, and capacitor 82. The capacitor 46 serves as a low impedance path for the a.c. current through diode 42. In an exemplary embodiment, circuit values have been selected such that with very low or no signal output from receiver crystal 16, the signal output at second carrier amplifier 60 lacks sufficient amplitude to produce a d.c. voltage across capacitor 92 which exceeds the d.c. offset voltage applied to the inverting input of operational amplifier 70. The output of operational amplifier 70 thus saturates at near −6 volts. This −6 volt level, applied through resistor 106, is used to signify loss of carrier and is the disconnect signal 104.

Figure 4:
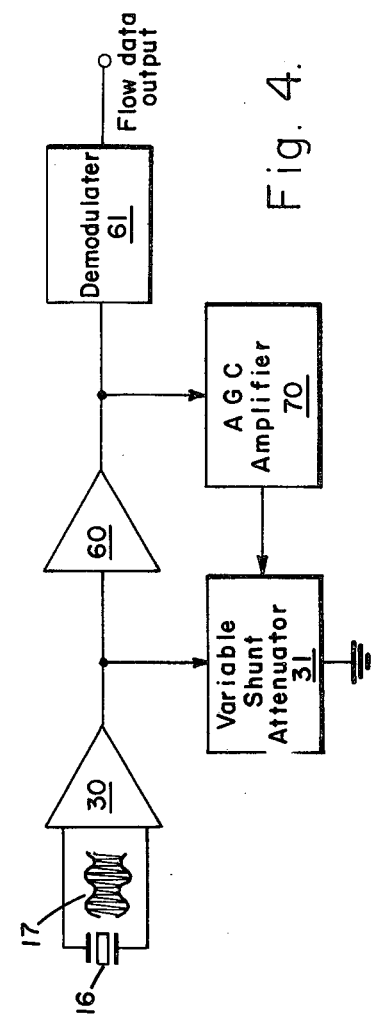
FIG. 4 is a conceptual functional block diagram of the system of the invention.

By way of recapitulation, attention may be directed to the functional block diagram FIG. 4. An exemplary modulated waveform is identified by the numeral 17 and is shown as applied from receiver piezoelectric crystal 16 to first carrier amplifier 30. The receiver crystal 16 acts somewhat as an ultrasonic microphone receiving the composite ultrasonic acoustic signal propagated perpendicular to the direction of fluid flow through the flow tube. The composite signal is the acoustic carrier signal that has been amplitude-modulated by the vortices generated as previously described.

As illustrated, signal output from first amplifier 30 is applied to the input of second amplifier 60, however, the amplitude of this signal is first conditioned by the action of the variable shunt attenuator 31 so as to reduce the amplitude of the signal as necessary to maintain a constant signal at the output of the second amplifier 60. This amplitude reduction is accomplished by passing some of the signal current to ground and thereby loading the output of the first amplifier 30.

The amplified output signal from the second amplifier 60 is then applied both to the automatic gain control rectifier and amplifier 70 and to demodulator 61. In the automatic gain control rectifier and amplifier 70 the signal is rectified to produce a d.c. voltage which is amplified to provide two output signals. One of these output signals is known as the disconnect signal and provides an indication of the level of an acceptable input signal from the receiver crystal. Whenever the signal changes by a predetermined amount, a disconnect condition is said to have occurred. The other d.c. signal is the automatic gain control signal which controls the variable shunt attenuator so as to maintain a constant signal amplitude at the output of the second amplifier 60.

The demodulator 61 filters out the high frequency carrier component of the composite signal, leaving the flow data output signal.

Thus there has been described a low noise, ultrasonic signal amplifier with automatic gain control and carrier loss detector that will provide a superior method of amplification of amplitude-modulated, ultrasonic frequency electronic signals and superior loss of carrier signal detection. Great improvements in reliability, flexibility, and ease of operation have been provided through the novel advantages of the invention.

It is pointed out that although the present invention has been shown and described with reference to particular embodiment, nevertheless various changes and modifications obvious to one skilled in the art to which the invention pertains are deemed to lie within the purview of the invention.

What is claimed and desired to be secured by Letters Patent of the United States is:

1. An ultrasonic fluid flow measurement system comprising:
   means for generating a Karman vortex street in a flowing fluid;
   means for propagating an acoustic carrier signal normal to said Karman vortex street;
   means to amplitude-modulate said acoustic carrier signal in accordance with modulating properties of said Karman vortex street so as to produce a composite amplitude-modulated acoustic signal comprising frequency components of said acoustic carrier signal and of said modulating properties of said Karman vortex street;
   means for converting said composite amplitude-modulated acoustic signal to a composite electrical signal;
   first carrier amplifier means for amplifying said composite electrical signal so as to obtain an amplified composite electrical signal;
   variable-shunt attenuator means responsive to said amplified composite electrical signal so as to obtain an amplitude-conditioned, composite electrical output signal;
   second carrier amplifier means responsive to said amplitude-conditioned, composite, electrical output signal and furnishing a second-amplifier, output signal;
   automatic gain control means responsive to said second-amplifier, output signal, furnishing control signal for said variable-shunt attenuator means so as to maintain constant signal amplitude of said second-amplifier, output signal;
   means within said automatic gain control means for generating a disconnect signal when said electromagnetic carrier signal drops to zero level; and
   demodulator means for separating said frequency components of said electromagnetic carrier signal and said modulating properties of said Karman vortex street.

2. The ultrasonic fluid flow measurement system of claim 1, wherein said means for generating a Karman vortex street in a flowing fluid comprise placement of a vortex generating strut of triangular cross section normal to the direction of fluid flow.

3. The ultrasonic fluid flow measurement system of claim 1, wherein said means for propagating an acoustic carrier signal normal to said Karman vortex street comprise a piezoelectric transducer responsive to signal energy from a transmitter.

4. The ultrasonic fluid flow measurement system of claim 1, wherein said means to amplitude-modulate said acoustic carrier signal in accordance with modulating properties of said Karman vortex street so as to produce an amplitude-modulated acoustic signal comprising frequency components of said acoustic carrier signal and of said modulating properties of said Karman vortex street comprise means to effect conjunction of said acoustic carrier signal with said Karman vortex street.

5. The ultrasonic fluid flow measurement system of claim 1, wherein said means for converting said composite amplitude-modulated acoustic signal to a composite electromagnetic signal comprise a receiver responsive to signal energy input from a piezoelectric receiver transducer.

6. The ultrasonic fluid flow measurement system of claim 1, wherein said variable shunt attenuator means comprise diode means coupled with resistor means so as to present a variable resistance dependent upon the state of conduction o said diode means.

7. The ultrasonic fluid flow measurement system of claim 1, wherein said automatic gain control means comprise an operational amplifier having two output signals wherein one output signal is a d.c. voltage effective to control the variable shunt attenuator so as to maintain a constant signal output of said second carrier amplifier means and another output signal is a d.c. voltage that provides an indication of the level of an acceptable input signal from said composite amplitude-modulated acoustic signal.

8. The ultrasonic fluid flow measurement system of claim 7, wherein said another output signal provides a disconnect signal resulting from the disruption of said acoustic carrier signal.

* * * * *